United States Patent
Yano (10) Patent No.: US 7,899,435 B2
(45) Date of Patent: Mar. 1, 2011

(54) WIRELESS COMMUNICATION UNIT, POWER CONTROL METHOD FOR WIRELESS COMMUNICATION UNIT AND WIRELESS NETWORK

(75) Inventor: Hitoshi Yano, Tokyo (JP)

(73) Assignee: NEC Corporation, Tokyo (JP)

( * ) Notice: Subject to any disclaimer, the term of this patent is extended or adjusted under 35 U.S.C. 154(b) by 539 days.

(21) Appl. No.: 11/991,650

(22) PCT Filed: Sep. 11, 2006

(86) PCT No.: PCT/JP2006/317997

§ 371 (c)(1),
(2), (4) Date: Mar. 7, 2008

(87) PCT Pub. No.: WO2007/032317

PCT Pub. Date: Mar. 22, 2007

(65) Prior Publication Data

US 2009/0156245 A1 Jun. 18, 2009

(30) Foreign Application Priority Data

Sep. 16, 2005 (JP) .......................... 2005-270103

(51) Int. Cl.
*H04B 1/16* (2006.01)
*H04B 1/38* (2006.01)
(52) U.S. Cl. ..................... 455/343.3; 455/574
(58) Field of Classification Search ............. 455/343.1, 455/343.2, 343.3, 574; 370/311
See application file for complete search history.

(56) References Cited

U.S. PATENT DOCUMENTS

| | | | |
|---|---|---|---|
| 5,031,231 A * | 7/1991 | Miyazaki | ................... 455/574 |
| 5,400,359 A | 3/1995 | Hikoso et al. | |
| 5,606,739 A * | 2/1997 | Goto | ..................... 455/343.3 |
| 6,633,753 B1 * | 10/2003 | Kido | ..................... 455/343.2 |
| 7,109,875 B2 | 9/2006 | Ota et al. | |
| 7,242,942 B2 | 7/2007 | Kunihiro | |

FOREIGN PATENT DOCUMENTS

JP 06-120853 4/1994

(Continued)

*Primary Examiner*—Quochien B Vuong
(74) *Attorney, Agent, or Firm*—Foley & Lardner LLP (57) ABSTRACT

The present invention, which is aimed at providing a wireless communication unit which is operated by battery power and offers long battery life, power control method thereof and a wireless network which utilizes the wireless communication unit, includes: a direct demodulation standby part for prestoring an own unit identification code to compare the identification code included in the high-frequency signal with the own unit identification code; an intermittent power supply part for intermittently supplying power to the direct demodulation standby part; and a power control part for controlling the power supply to the transmitting/receiving part, wherein the direct demodulation standby part notifies the power control part and the intermittent power supply part, whether or not the identification code coincides with the own unit identification code after comparing the both, the power control part supplies power to the transmitting/receiving part upon receiving the notification from the direct demodulation standby part, indicating that the identification code coincides with the own unit identification code, and the intermittent power supply part intermittently supplies power to the direct demodulation standby part upon receiving the notification from the direct demodulation standby part indicating that the identification code does not coincide with the own unit identification code.

7 Claims, 6 Drawing Sheets

FOREIGN PATENT DOCUMENTS

| | | |
|---|---|---|
| JP | 06-141016 | 5/1994 |
| JP | 08-116301 | 5/1996 |
| JP | 3039496 | 5/1997 |
| JP | 10-178384 | 6/1998 |
| JP | 11-243590 | 9/1999 |
| JP | 2001-102955 A | 4/2001 |
| JP | 2002-344245 A | 11/2002 |
| JP | 2003-124862 A | 4/2003 |
| JP | 2003-318807 A | 11/2003 |
| JP | 2004-007457 A | 1/2004 |
| JP | 2004-214989 A | 7/2004 |
| JP | 2005-110288 A | 4/2005 |

* cited by examiner

SERVER NODE

WIRELESS NODE

WIRELESS NODE

FIG. 6

| ID OF WIRELESS NODE 602 | ID OF WIRELESS NODE 603 | ID OF WIRELESS NODE 606 | TRANSMISSION DATA | ID OF WIRELESS NODE 601 |

| ID OF WIRELESS NODE 603 | ID OF WIRELESS NODE 606 | TRANSMISSION DATA | ID OF WIRELESS NODE 601 | ID OF WIRELESS NODE 602 |

| ID OF WIRELESS NODE 606 | TRANSMISSION DATA | ID OF WIRELESS NODE 601 | ID OF WIRELESS NODE 602 | ID OF WIRELESS NODE 603 |

| ID OF WIRELESS NODE 603 | ID OF WIRELESS NODE 602 | ID OF WIRELESS NODE 601 | TRANSMISSION DATA | ID OF WIRELESS NODE 606 |

| ID OF WIRELESS NODE 602 | ID OF WIRELESS NODE 601 | TRANSMISSION DATA | ID OF WIRELESS NODE 606 | ID OF WIRELESS NODE 603 |

| ID OF WIRELESS NODE 601 | TRANSMISSION DATA | ID OF WIRELESS NODE 606 | ID OF WIRELESS NODE 603 | ID OF WIRELESS NODE 602 |

WIRELESS COMMUNICATION UNIT, POWER CONTROL METHOD FOR WIRELESS COMMUNICATION UNIT AND WIRELESS NETWORK

This application is the National Phase of PCT/JP2006/317997, filed Sep. 11, 2006, which claims priority to Japanese Application No. 2005-2370103 filed Sep. 16, 2005, the disclosures of which are hereby incorporated by reference in their entirety.

TECHNICAL FIELD

The present invention relates to a wireless communication unit and a wireless network, particularly to power-saving reception during reception standby.

BACKGROUND ART

Since a wireless communication unit of a portable terminal type essentially requires battery operation in general, suppressing the power consumption of the entire terminal hitherto has been a technical issue.

Figure 8:
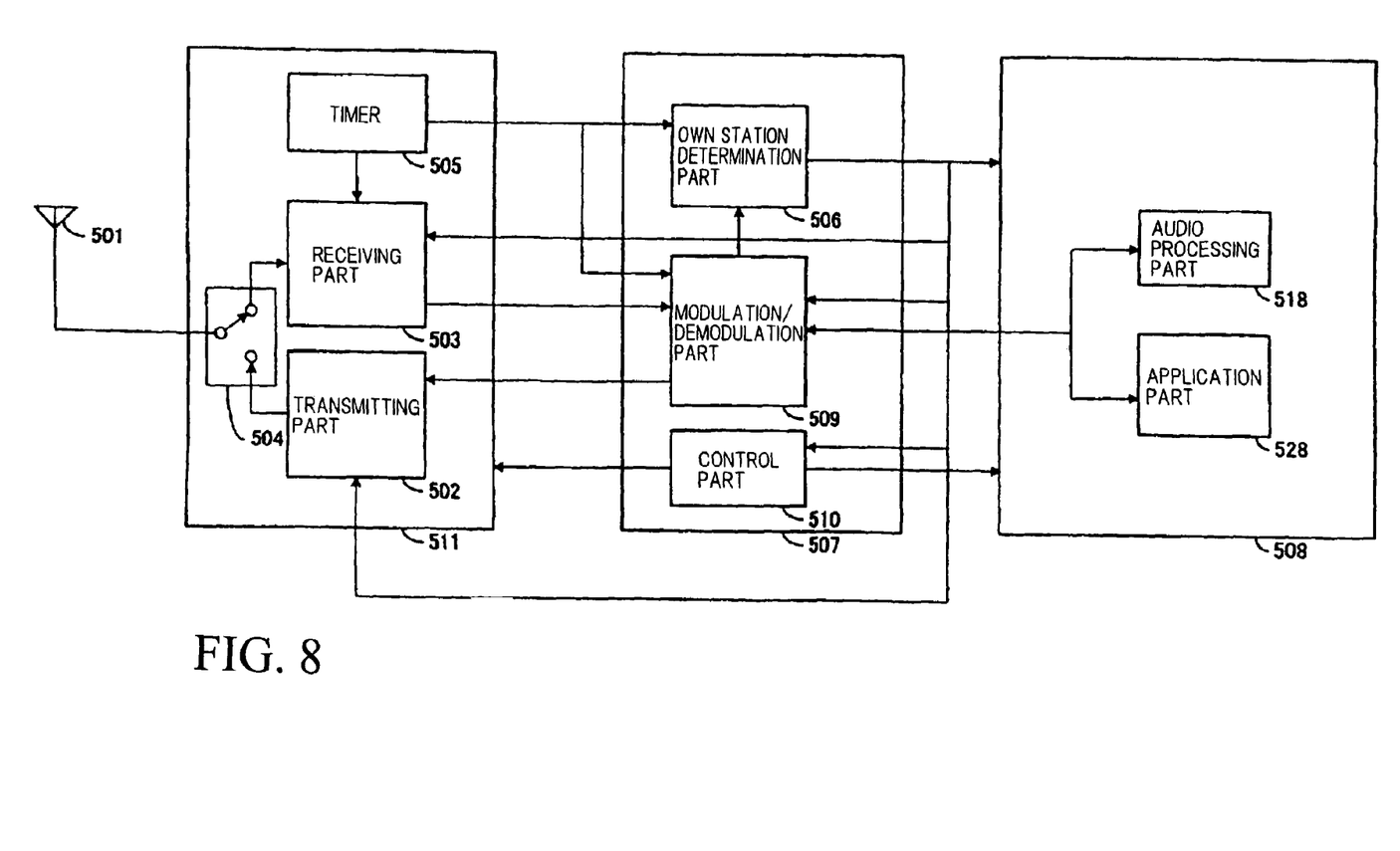
FIG. 8 is a block diagram to show a configuration example of a conventional wireless communication unit.

FIG. 8 is a block diagram to show the configuration of a wireless communication unit of a related art example; the operation of which for suppressing power consumption will be described below.

A wireless communication unit is made up of: antenna 501 for performing transmission/reception of a high-frequency signal to and from another wireless communication unit; transmitting/receiving circuit 511 for performing analog processing of a high-frequency signal; baseband. processing part 507 for performing modulation/demodulation of a high-frequency signal to control the wireless communication unit; and application processing part 508 for performing audio processing etc.

Transmitting/receiving circuit 511 is made up of: transmitting part 502 for transmitting a high-frequency signal; receiving part 503 for receiving a high-frequency signal; antenna change-over switch 504 for switching between transmission by transmitting part 502 and reception by receiving part 503; and timer 505 for intermittently activating necessary components.

Baseband processing part 507 is made up of: modulation/demodulation part 509 for performing baseband modulation/demodulation of a signal; own station determination part 506 which determines whether or not a received signal is addressed to own unit and, when determined that it is addressed to the own unit, supplies power to respective components to activate them; and control part 510 for controlling each part and the flow of the signal in each part of the wireless communication unit.

Application processing part 508 is made up of: audio processing part 518 for processing voices; and application part 528 for processing data, information, and others.

Conventionally, it has been necessary for a wireless communication unit that transmitting/receiving circuit 511 be constantly operated to share the network information with another wireless communication unit, which is the communication counterpart, so as to be ready to be connected to a communications line whenever communication is needed.

On the other hand, various proposals for suppressing the power consumption of a wireless communication unit have been made.

A first method of suppressing power consumption is the method of providing an arrangement in which power is not supplied unless otherwise required, to the components that are not directly related to wireless communication, from among the components of application processing part 508, and this method is being commonly used.

A more advanced method of suppressing power consumption is the method of putting a wireless communication unit into a reception standby state in such a way that only receiving part 503 of transmitting/receiving circuit 511, baseband processing part 507, and own station determination part 506 are operated and such that the other components of the wireless communication unit are powered off.

Further, a PHS (Personal Handyphone System) has been proposed in which timer 505 is used in the mobile station to turn off the power supply of the transmitting circuit and to intermittently operate the receiving circuit during standby of the mobile station so that the current consumption during standby of the mobile station is reduced, thereby increasing battery life (see Patent document 1).

Further, in a wireless communication unit for 1-to-1 communication such as a simple wireless interphone, a specified low-power wireless communication equipment is proposed in which a diode detector circuit, a low-frequency amplifier circuit and a logic circuit are provided in the subsequent stage to a high-frequency amplifier part to enable the determination of the presence or absence of a received signal so that the switch is closed, only upon determination of the presence of a received signal, to supply power to each part making up the specified low-power wireless communication equipment, thereby avoiding the wasting of power (see Patent document 2).

Further, there has been also proposed a communication apparatus in which a control part and a communication part, which consumes relatively low power, are provided, and the control part activates the low power consuming communication part, putting it into a standby state at a low power consumption and, when communication is started at the low power consuming communication part and a communication line is established, activates a communication part for high data rate communication to perform communications (see Patent Document 3).

Patent document 1: Japanese Patent Laid-Open No. 08-116301.

Patent document 2: Japanese Patent Laid-Open No. 06-120853.

Patent document 3: Japanese Patent Laid-Open No. 2003-124862.

However, for a mobile wireless/PHS whose sensitivity cannot be reduced in terms of maintaining its communication quality, receiving part 503 requires a high-sensitivity and complex configuration typified by a superheterodyne scheme.

However, because the superheterodyne scheme, however, requires heavily equipped circuits having a complicated configuration, such as a high-frequency amplification circuit and a medium-frequency amplification circuit, in addition to a local oscillator (typically including a complicated circuit of a phase-locked loop configuration) and a mixer circuit for stably performing frequency conversion, it is not easy to reduce power consumption of the circuit itself.

Therefore, a problem exists in that there is no way to control the amount of power to be consumed except through an intermittent operation by means of timer 505.

However, as it is well known, the battery life in a mobile radio system such as PHS tends to be merely 300 to 400 hours at the longest.

In an exemplary disclosure of Patent document 2, although the power during standby is suppressed by providing a circuit for detecting the presence or absence of a carrier wave, and the circuit is simplified by making it dedicated a carrier wave, there is a problem in that this method will not be effective unless 1-to-1 communication with a fixed party is assumed.

Because a method which detects the presence or absence of a signal of a carrier wave, is likely to be responsive to a carrier wave signal from another wireless system not anticipated, this will result in malfunction of the communication unit that is being used.

Thus, a problem exists in that the suppression of power consumption of a wireless communication unit is only intended for wireless systems which are currently being used as 1-to-1 communication or an equivalent thereof.

Further, since the communication apparatus disclosed in Patent document 3 utilizes different kinds of communication media such as infrared radiation and extremely low-power radio waves, a problem exists in that a dedicated transmitting part is required.

Thus, it is an object of the present invention to provide a wireless communication unit which is operated by a battery and offers long battery life, and a wireless network which utilizes the wireless communication unit.

DISCLOSURE OF THE INVENTION

In order to achieve the above described object, a first embodiment of the wireless communication unit and wireless network of the present invention is a wireless communication unit comprising a transmitting/receiving part which transmits and receives a high-frequency signal including an identification code for individually identifying the wireless communication unit, the wireless communication unit comprising:

a direct demodulation standby part for prestoring an own unit identification code which indicates the identification code of its own, and for demodulating the high-frequency signal to compare the identification code included in the high-frequency signal with the own unit identification code;

an intermittent power supply part for intermittently supplying power to the direct demodulation standby part; and a power control part for controlling the power supply to the transmitting/receiving part, wherein the direct demodulation standby part notifies the power control part and the intermittent power supply part whether or not the identification code coincides with the own unit identification code after comparing both, the power control part supplies power to the transmitting/receiving part upon receiving a notification indicating from the direct demodulation standby part, that the identification code coincides with the own unit identification code, and the intermittent power supply part intermittently supplies power to the direct demodulation standby part upon receiving a notification from the direct demodulation standby part indicating that the identification code does not coincide with the own unit identification code.

A second embodiment is the wireless communication unit according to the first embodiment, wherein the direct demodulation standby part comprises:

a power divider for power dividing the received high-frequency signal, a delay element for delaying the high-frequency signal power divided by the power divider, an analog multiplier into which is inputted with the power divided high-frequency signal and the high-frequency signal delayed by the delay element to multiply them together and for outputting a multiplication signal, and a filter for removing a high-frequency component from the multiplication signal outputted from the analog multiplier to output a direct demodulation signal including the identification code of the wireless communication unit, wherein the direct demodulation signal outputted from the filter is a signal demodulated from the carrier wave included in the high-frequency signal.

A third embodiment is the wireless communication unit according to the first embodiment, wherein the intermittent power supply part comprises a timer and, at a time specified by the timer, supplies power to the direct demodulation standby part.

A fourth embodiment is the wireless communication unit according to the first embodiment, wherein the high-frequency signal is a binary amplitude modulated, frequency modulated, or phase modulated signal.

A fifth embodiment is the wireless communication unit according to the first embodiment, wherein when a plurality of the identification codes are included in the high-frequency signal and the plurality of the identification codes are listed, transmission/reception is performed by relaying the codes in turn to each of the wireless communication units corresponding to the listed identification codes.

A sixth embodiment is a wireless network, wherein the wireless communication unit according to the first embodiment is disposed at a location at which communication with at least one other adjacent wireless communication unit is possible such that a. plurality of wireless communication units are disposed in a net-like state, a network management server for storing paths which enable communication between the mutually adjacent wireless communication units is provided, and when one of the wireless communication units communicates with another one of the wireless communication units disposed in the wireless network, the network management server advices the combination of paths stored in the network management server.

A seventh embodiment is a method of controlling power for a wireless communication unit, that method being executed in a wireless communication unit, which comprises: a transmitting/receiving part for transmitting/receiving a high-frequency signal including an identification code for individually identifying the wireless communication unit; and a direct demodulation stand by part for prestoring an own unit identification code indicating the identification code of its own, and for demodulating the high-frequency signal to compare the identification code included in the above described high-frequency signal with the own unit identification code, wherein when the direct demodulation standby part detects that the identification code coincides with the own unit identification code, power is supplied to the transmitting/receiving part, and when the direct demodulation standby part detects that the identification code does not coincide with the own unit identification code, power is intermittently supplied to the direct demodulation stand by part.

The wireless communication unit of the present invention comprises a direct demodulation standby part as a dedicated standby reception circuit of low power consumption, and further the direct demodulation standby part is controlled to intermittently operate during standby for reception, by an equipped intermittent power supply part including a timer.

The direct demodulation standby part, which has a function as a dedicated standby reception circuit, includes a direct demodulation part, and a comparison part for comparing the data demodulated by the direct demodulation part and specific data included in a wireless communication unit to individually identify the wireless communication unit. Moreover, the wireless communication unit includes a power control part for providing/interrupting power supply to the transmitting/receiving part depending on the comparison result of the comparison part.

The present wireless communication unit is configured such that a calling side wireless communication unit sends out a signal modulated with specific data as a call signal, and a called side wireless communication unit that has been called receives the call signal and directly demodulates it with a dedicated direct demodulation standby part to compare the identification code of the wireless communication unit included in the directly demodulated signal with an own unit identification code which is specific data; and when they coincide with each other, the called side wireless communication unit that was called recognizes that the own unit is being called, and power is supplied to the circuit, except for the standby reception circuits (direct demodulation standby part) of the wireless communication unit, through the power control by the power control part, thereafter starting communication.

According to the present invention, a wireless communication unit which operates by a battery and offers long battery life, and a wireless network using the wireless communication unit can be obtained.

DESCRIPTION OF SYMBOLS

100 Transmitting/receiving part
101 Antenna
102 Antenna change-over switch
103 Direct demodulation standby part
104 Power control part
106 Main receiving part
107 Transmitting part
108 Application processing part
109 Intermittent power supply part
111 Transmitting/receiving part
118 Audio processing part
128 Application part
201 Power divider
202 Delay element
203 Analog multiplier
204 Lowpass filter
501 Antenna
502 Transmitting part
503 Receiving part
504 Antenna change-over switch
505 Timer
506 Own station determination part
507 Baseband processing part
508 Application processing part
509 Modulation/demodulation part
510 Control part
511 Transmitting/receiving circuit
518 Audio processing part
528 Application part
600 Server node
601 to 60n Wireless node (Wireless communication unit)
1031 Direct demodulation part
1032 Comparison part (Logic circuit)
1033 Memory
1061 High-frequency amplifier
1062 Mixer
1063 Band pass filter (BPS)
1064 Demodulation part
1065 Logic circuit
1066 Local oscillator (LO)

BEST MODE FOR CARRYING OUT THE INVENTION

The modes for carrying out the present invention will be described with reference to the drawings.

Figure 1:
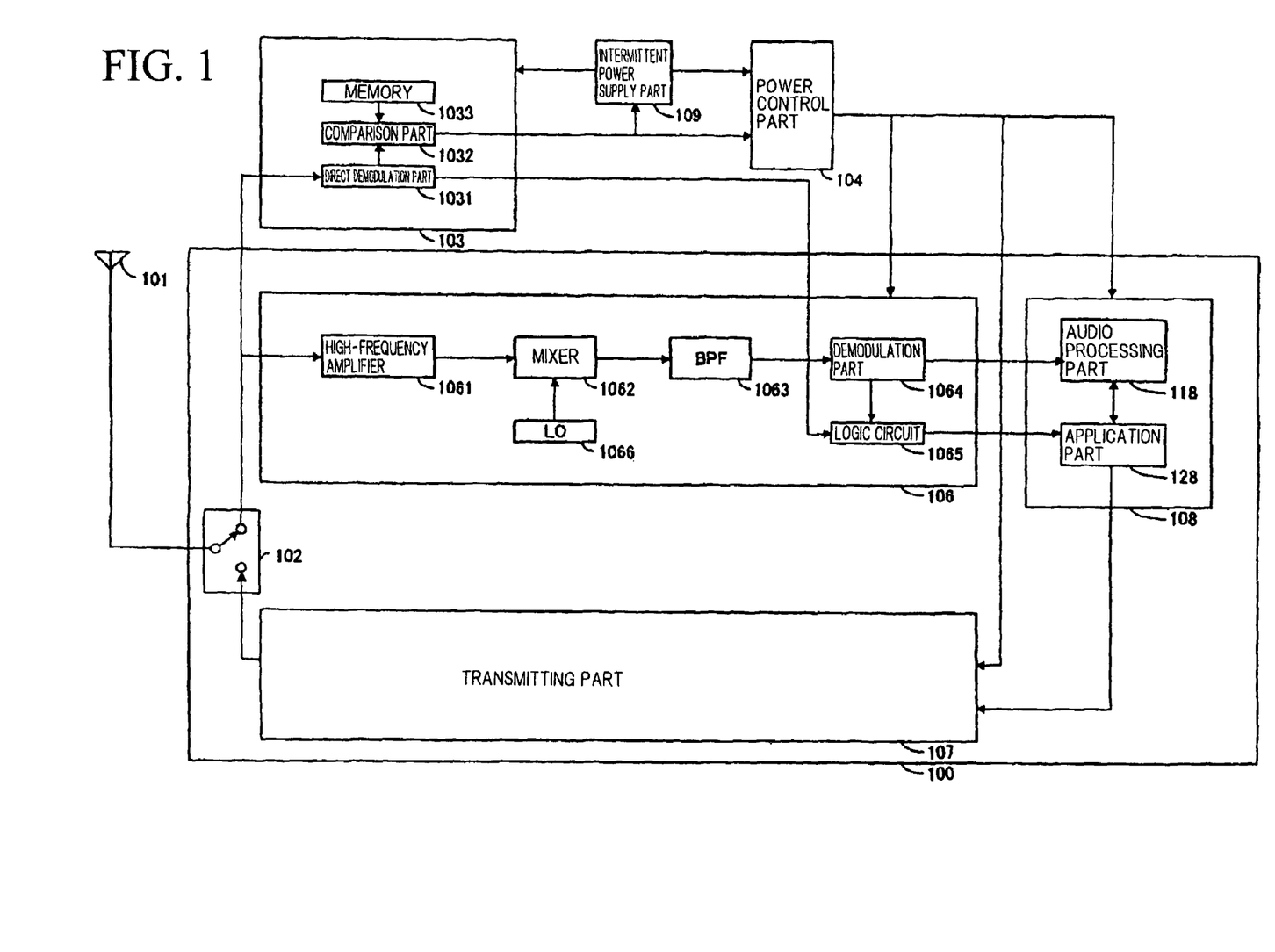
FIG. 1 is a block diagram to show a configuration example of the wireless communication unit of an exemplary embodiment of the present invention.

FIG. 1 is a block diagram to show a configuration example of the wireless communication unit of an exemplary embodiment of the present invention.

The wireless communication unit of the exemplary embodiment is made up of antenna 101 for performing the transmission/reception of a high-frequency signal to and from another wireless communication unit, a transmitting/receiving part 100 for transmitting and receiving a high-frequency signal including an identification code for individually identifying the wireless communication unit, direct demodulation standby part 103 for performing reception during standby and decoding the identification code of wireless communication unit included in the received data, intermittent power supply part 109 including a timer and that is used for intermittently supplying power at a required time interval, and power control part 104 for supplying power to transmitting/receiving part 100 when transmission/reception needs to be performed at transmitting/receiving part 100.

Transmitting/receiving part 100 comprises transmitting part 107 for transmitting a high-frequency signal including an identification code for individually identifying the wireless communication unit, to another wireless communication unit, main receiving part 106 for receiving a high-frequency signal from another wireless communication unit, application processing part 108 for performing the processing of voices, applications, and the like, and antenna change-over switch 102 for switching between transmission and reception.

Direct demodulation standby part 103 includes a dedicated standby reception function for performing reception during standby, even in a reception standby state of the wireless communication unit of the present embodiment in which power is not supplied to main receiving part 106, transmitting part 107, and to others from power control part 104.

Direct demodulation standby part 103 is made up of: direct demodulation part 1031 for receiving and demodulating a high-frequency signal transmitted from another wireless communication unit; memory 1033 for storing, as an own unit identification code which is specific data, an identification code of own unit which is individually provided to the wireless communication unit for discriminating the wireless communication units from the others; and comparison part 1032 for comparing the identification code of a wireless communication unit included in the signal demodulated by direct demodulation part 1031 with the specific data (own unit identification code) stored in memory 1033 to determine whether or not they coincide with each other.

Figure 2:
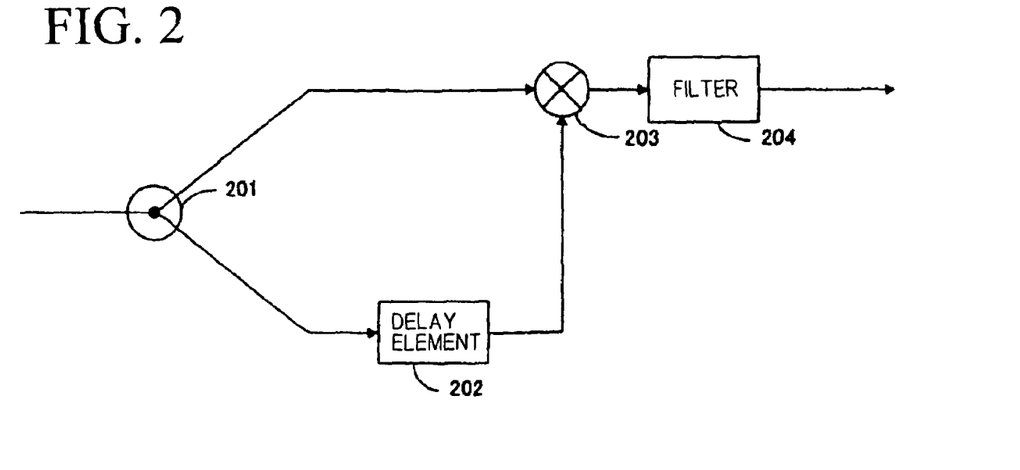
FIG. 2 is a block diagram to show a configuration example of the direct demodulation part of the wireless communication unit of the exemplary embodiment.

Next, a configuration example of direct demodulation part 1031 will be shown in FIG. 2.

As shown in the figure, direct demodulation part 1031 is made up of: power divider 201 for power dividing a received high-frequency signal; delay element for delaying the received high-frequency signal; analog multiplier 203 for multiplying inputted high-frequency signals to output a multiplication signal; and filter 204 for removing a high-frequency component from the multiplication signal outputted from analog multiplier 203.

From among these, although analog multiplier 203 generally uses an active device such as a transistor, the components such as power divider 201 and delay element 202 may be made up of a passive part which does not consume power. Thus, it is possible to significantly reduce the power consumption of direct demodulation part 1031.

Figure 3:
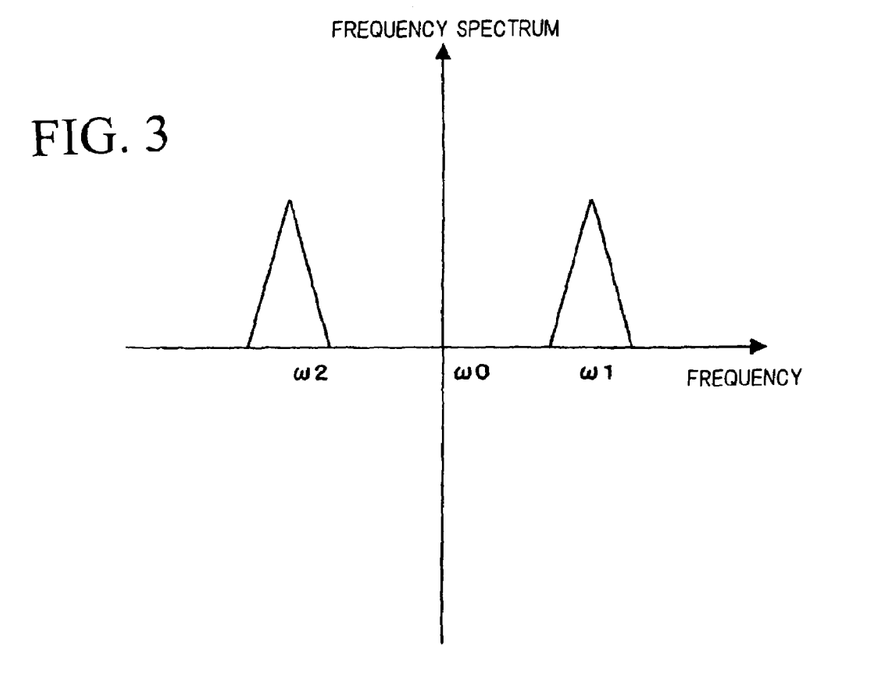
FIG. 3 shows the spectrum of a high-frequency signal which is received by the direct demodulation part.

In this configuration, direct demodulation part 1031 is inputted with, for example, a high-frequency signal with a spectrum as shown in FIG. 3.

The abscissa in the figure shows the frequency of the high-frequency signal, and the ordinate shows the strength of the each frequency spectrum. As shown in the figure, this high-frequency signal is a high-frequency signal modulated by FSK (Frequency Shift Keying) with a signal of frequency $\omega 1$ being a signal corresponding to symbol "0", and with a signal of frequency $\omega 2$ being a signal corresponding to symbol "1".

These symbols "0" and "1" correspond to logic values "0" and "1" of the binary signal treated in a logic circuit.

Where, let $(\omega 1+\omega 2)/2=\omega 0$ in the figure.

By doing this, the high-frequency signal inputted into power divider 201 becomes $V0=\sin(\omega 1 t)$ for symbol "0".

Further, $V1=\sin(\omega 2 t)$ for symbol "1".

Figure 4:
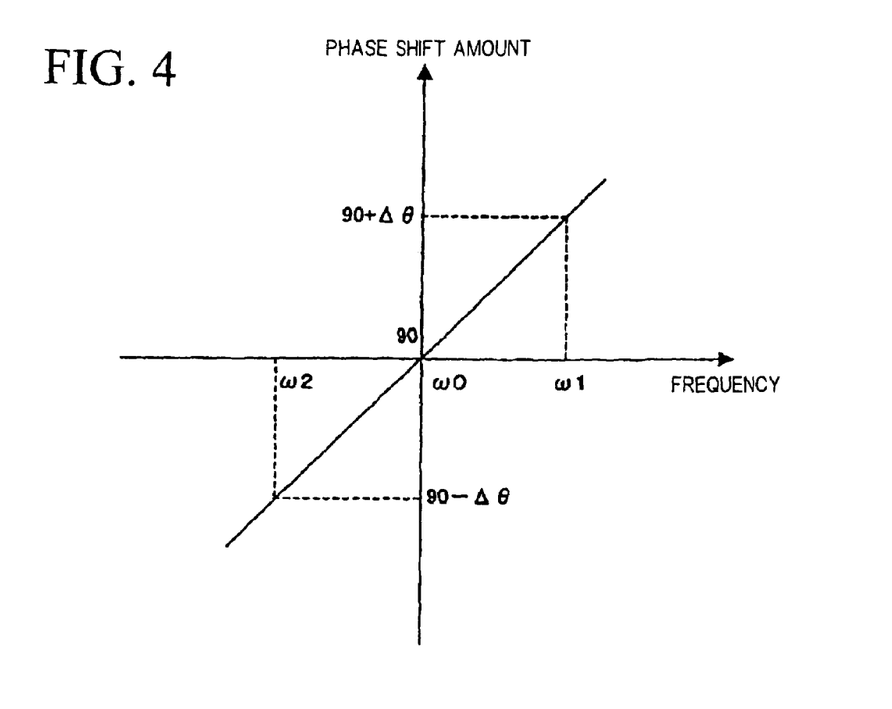
FIG. 4 is a characteristic chart of the phase shift amount due to the delay by a delay element.

Next, characteristics of delay element 202 are shown in FIG. 4.

The abscissa in the figure shows the frequency of a high-frequency signal and the ordinate shows the phase shift amount, that is, a delay amount of each frequency of a delayed high-frequency signal.

As seen from the figure, the phase shift amount at frequency $\omega 0$ is 90 degrees, the phase shift amount at frequency $\omega 1$ is $90+\Delta\theta$ being shifted by $\Delta\theta$ from frequency $\omega 0$, and the phase shift amount at frequency $\omega 2$ is $90-\Delta\theta$ being shifted by $-\Delta\theta$ from frequency $\omega 0$.

The high-frequency signal of symbol "0", which has passed through power divider 201 with the above described characteristics and delay element 202, becomes $VO\_1 =\sin(\omega 1 t*\Delta\theta)$.

Since the inputs into analog multiplier 203 are V0 and V0_1, the output, which is the result of multiplication by analog multiplier 203, will be as follow.

$$V0 \times V0\_1 = \sin(\omega 1 t)\sin(\omega 1 t-(90-\Delta\theta))\sin(\omega 1)(-\cos 2\omega 1 t \cdot \Delta\theta))/2$$

The $2\omega 1$ component of the signal shown by this equation is removed by filter 204 and, after being passed through filter 204, only direct current component $\sin(\Delta\theta)/2$ remains. Here, if AO is positive, the output from filter 204 will become positive voltage.

Similarly in the case of symbol "1", after being treated in the same manner, only the direct current component $-\sin(-\Delta\theta/2=-\sin(\Delta\theta)/2$ remains after being passed through filter 204 and, if $\Delta\theta$ is positive, the output from filter 20 will become negative voltage.

Thus, the frequency $\omega 1$ corresponding to symbol "1" is outputted from filter 204 as a negative output voltage, and the frequency $\omega 2$ corresponding to symbol "0" is outputted from filter 204 as a positive output voltage.

In this way, a high-frequency signal inputted into direct demodulation part 1031 is demodulated and a positive voltage corresponding to a logic value "0" included in the signal is obtained, and also a negative voltage corresponding to a logic value "1" is obtained as a binarized demodulation signal.

This is the same thing as obtaining a logic value included in the data transmitted from a wireless communication unit, and the information indicated by this logic value can be obtained through direct demodulation part 1031.

Thus, a high-frequency signal, which is modulated and transmitted by a wireless communication unit, may be a binary amplitude modulated, frequency modulated or phase modulated signal, and a corresponding detector circuit or the like may be provided in place of direct demodulation part 1031.

Thus, direct demodulation part 1031 is a demodulation circuit having a simple configuration made up of a circuit including no local oscillator, and provides a receiving circuit which consumes less power compared with a normal superheterodyne-type receiving part.

Further, direct demodulation standby part 103 is made up of minimum functional blocks such as direct demodulation part 1031, memory 1033, and comparison part 1032, and thus provides a configuration in which the power consumption by these functional blocks is also small.

Furthermore, direct demodulation standby part 103 including direct demodulation part 1031 is configured to come into a reception state by being intermittently activated by intermittent power supply part 109 so that the actual operating time is made small, thus suppressing the power consumption of direct demodulation standby part 103.

This intermittent reception may be adapted such that the intermittence interval may be appropriately set taking into consideration the application and operation of the wireless communication unit, and may also be configured such that direct demodulation standby part 103 is always supplied with power and is always ready for reception.

The specific data to be retained in memory 1033 are own unit identification codes including specific numbers individually assigned to the present wireless communication units, or identification codes specific to respective wireless communication units deployed in the wireless system making up a wireless network of a mesh structure.

In the case in which wireless communication units make up a mesh structure of network, this specific identification code is commonly retained by each wireless node to identify each wireless node when the wireless communication unit functions as a wireless node.

Memory 1033 may be a readable/writable memory or a read only memory.

Comparison part 1032 compares the identification code of a wireless communication unit included in a demodulated signal outputted from direct demodulation part 1031 with an own unit identification code (specific data) assigned to the own unit, which is retained in memory 1033, and when the result of the comparison indicates a coincidence between the codes, comparison part 1032 notifies the coincidence to power control part 104 so that power is supplied to main receiving part 106, transmitting part 107, application processing 108 and these components are activated to perform communication.

When the result of the comparison indicates a non-coincidence between the codes, comparison part 1032 notifies the non-coincidence to intermittent power supply part 109 so that the present wireless communication unit comes into a reception standby state, and no power is supplied to transmitting/receiving part 100.

Comparison part 1032, which is generally a CMOS circuit made by a CMOS process, is a low power consumption element which consumes only a little leak current when there is no input signal according to the characteristic feature of this CMOS circuit, and the power consumption of analog multiplier 203 will occupy the bulk of that of direct demodulation standby part 103.

Power control part 104 comprises, though not shown, a power supply for supplying power to each component of the present wireless communication unit and an open/close switch for power control to turn on and off the connection between the power supply and each component, and controls this open/close switch depending on the determination result of comparison part 1032.

The open/close switch for power control may use a MOS-FET as a switch when making up the present wireless communication unit with a CMOS process so that rapid switching of this MOSFET switch enables instantly supplying power to each component, main receiving part 106, transmitting part 107, and application processing part 108 to activate them.

Main receiving part 106 is configured to be a high sensitivity superheterodyne-type receiving circuit comprising: low noise, high-frequency amplifier 1061 for power amplifying a high-frequency signal received from another wireless communication unit as in the conventional manner; mixer 1062 for converting the frequency of the high-frequency signal into a middle-frequency signal; band pass filter 1063 for performing channel selection, demodulation part 1064 for performing baseband demodulation of the middle frequency signal; logic circuit 1065 for binarizing the demodulated signal demodulated at demodulation part 1064; and local oscillator 1066.

While the circuit of direct demodulation standby part 103 is simplified as already described, main receiving part 106 is configured to be a normal wireless communication unit which includes a frequency conversion function etc. so as to be able to provide a high performance modulation scheme and a high data transmission rate required by the applications of the present wireless communication unit.

Local oscillator 1066 is made up of a VCO (Voltage Controlled Oscillator), a PLL (Phase Locked Loop), and the like, and provides a local oscillation signal having a stable frequency to mixer 1062.

Application processing part 108 is made up of: audio processing part 118 for processing voices; and application part 128 which is a programmable, general purpose digital processing system, for example, a CPU and memory and which processes data, information, and others.

Intermittent power supply part 109, which controls the intermittent operation of direct demodulation standby part 103 and the like, is a power control circuit for causing direct demodulation standby part 103 to be in a receiving state at a specified time for a specified time period.

By raising the degree of intermittence of direct demodulation standby part 103 to decrease the time period in which power is supplied, the average power consumption of the present wireless communication unit is suppressed and when the present wireless communication device is operated by a battery, the operation period of battery may be extended.

Transmitting part 107 is a common wireless communication circuit which is used when a wireless communication unit, which is a wireless node, performs transmission to another wireless communication unit (wireless node) and performs data exchanges, and is made up of, though not shown, a modulation circuit for performing modulation, an up-converter for performing frequency conversion, a local oscillator, and a power amplifier for performing power amplification.

Transmitting part 107 can send a high-frequency signal which is modulated with a signal including an identification code which is specific data for activating the wireless communication unit (wireless node) of the receiving party, and there is no need for separately preparing a dedicated transmitting block corresponding to direct demodulation standby part 103.

Figure 5:
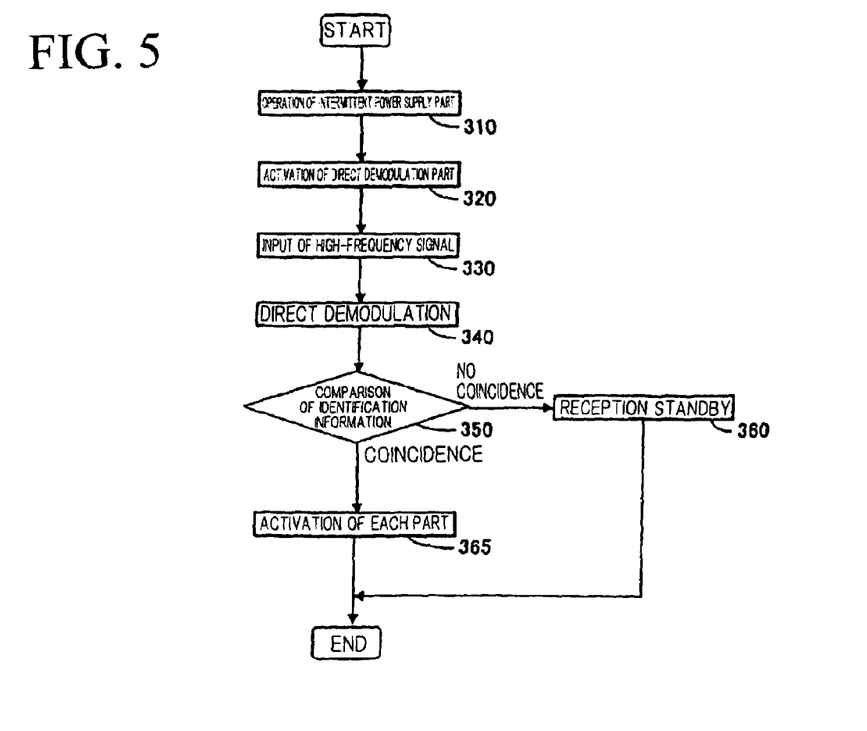
FIG. 5 is a flow chart to show processing of the direct demodulation standby part according to the exemplary embodiment.

Next, the operation sequence of standby reception of the wireless communication unit will be described using FIG. 5.

A high-frequency signal transmitted from an adjacent wireless communication unit is received by antenna 101.

When intermittent power supply part 109 operates (step 310) and direct demodulation part 103 is activated (step 320), the received high-frequency signal is inputted to direct demodulation standby part 103 (step 330) via antenna change-over switch 102 which is set to be in a receiving state.

Upon receiving a high-frequency signal inputted from antenna 101, direct demodulation part 1031 performs direct demodulation (step 340) for transforming the information included in the high-frequency signal into serial data of "0" and "1" by utilizing the carrier signal included in the high-frequency signal. This serial data includes an identification code which, as has already been described, enables to individual identification of the wireless communication unit.

The serial data outputted from direct demodulation part 1031 is inputted to comparison part 1032 and, when the serial data is inputted, comparison part 1032 compares the identification code of wireless communication unit in the head of the serial data with specific data indicating own unit (own unit identification code) that is prestored in memory 1033 (step 350).

When, as the result of comparison, the identification code of the serial data coincides with the specific data of memory 1033, following the COINCIDENCE path shown below step 350, comparison part 1032 notifies the coincidence to power control part 104. Having received the notification from comparison part 1032, power control part 104 supplies power to the components of the entire wireless communication unit such as main receiving part 106 to activate them (step 365).

Due to this supply of power, logic circuit 1065 of main receiving part 106 receives demodulated signal outputted from direct demodulation part 1031 to process it.

After each component such as main receiving part 106 is activated, high-frequency signals which have successively been transmitted from other wireless communication units to own unit are received at main receiving part 106 to perform similar processing as that of conventional wireless communication units.

When, in response to receiving a high-frequency signal, a response to the wireless communication unit which has transmitted the high-frequency signal is necessary, antenna change-over switch 102 is switched to the setting for connecting antenna 101 with transmitting part 107 to perform transmission for response through processing by application processing part 108, transmitting part 107, etc.

Further, when the content of a received high-frequency signal needs to be relayed and transmitted to other wireless units, antenna change-over switch 102 is switched to the setting for connecting antenna 101 with transmitting part 107 to perform transmission for relaying through processing by application processing part 108, transmitting part 107, and the like.

After the transmission, wireless communication unit returns antenna change-over switch 102 to the setting for reception, and returns into a reception standby state.

On the other hand, when as the result of the comparison by comparison part 1032, there is no coincidence, following the NO COINCIDENCE path on the right hand side of step 350, the wireless communication unit, which is also a wireless node, again returns to a receive standby state (step 360), that is, a state that only has the circuits that are necessary for reception standby such as intermittent power supply part 109 including direct demodulation part 103 and a timer, and then waits for the arrival of a high-frequency signal addressed to own unit in which own unit identification code is included.

Direct demodulation standby part 103 shown in FIG. 1, which is a component dedicated for reception during standby, provides significant reduction of energy consumption, since it can be tailored to a function to determine whether or not a received high-frequency signal is addressed to own unit, and it can be implemented only by hardware.

Figure 6:
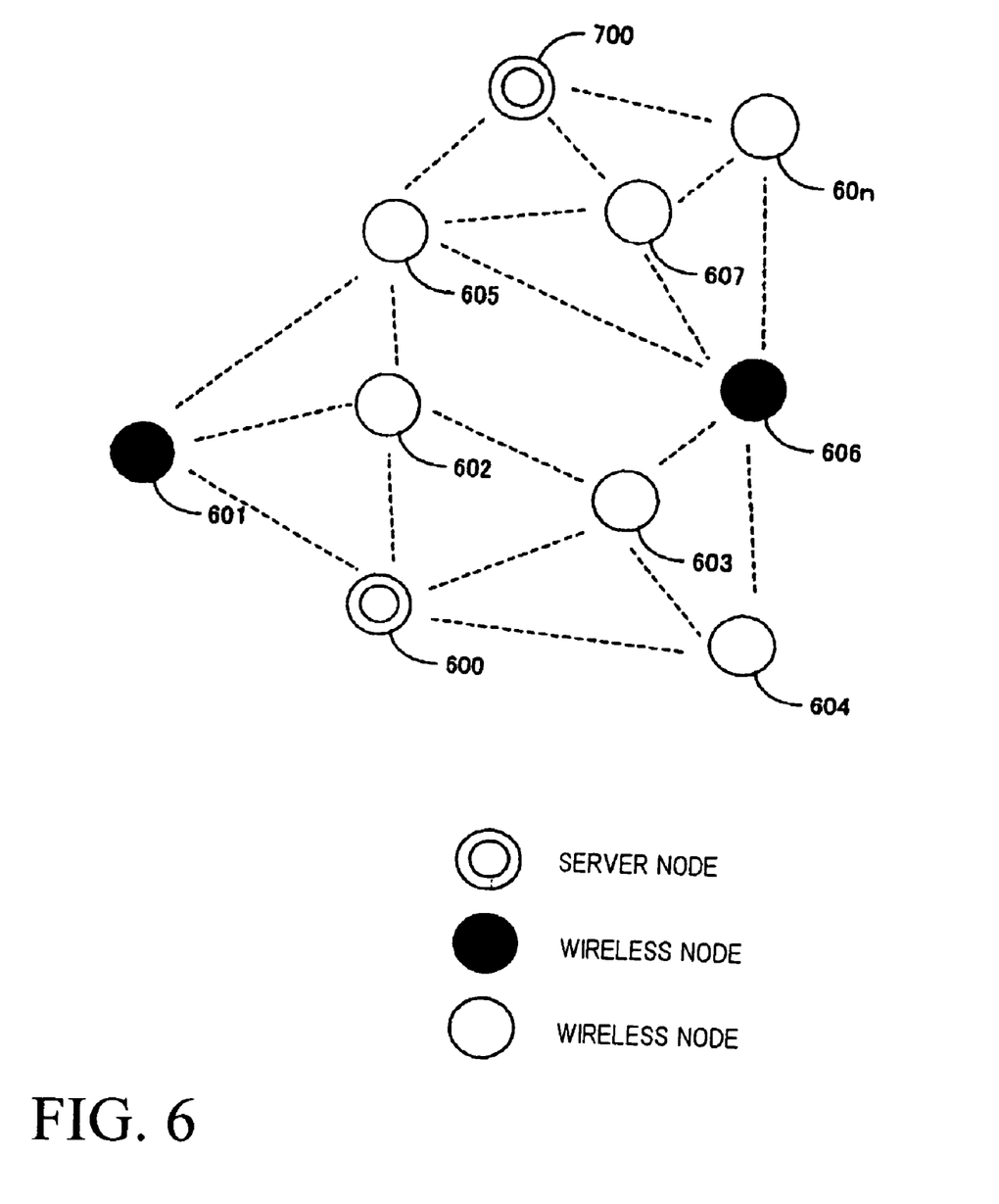
FIG. 6 is a block diagram to show a configuration example of the wireless network of the exemplary embodiment.

The wireless system made up of the wireless communication unit and the wireless network intended by the present invention assumes a new form of wireless system which will be deployed in the future, and its image is a structure in which wireless communication units are connected with each other in a mesh form as shown in FIG. 6.

This is quite different from the communication system of conventional mobile phones in which communication with other terminals is performed via a specific base station.

Hereinafter, when configuring a wireless network of whose terminals are the wireless communication unit having a wireless communication function described so far, each wireless communication unit will be referred to as a wireless node.

Next, a wireless network in which such a wireless communication unit is used as shown in FIG. 6, will be described in detail.

As shown in the figure, the wireless network is configured as a netlike mesh-network in which wireless nodes 601 to 60n made up of wireless communication units for performing communication, and server node 600, which has a function as a network management server for storing the paths to enable communication between adjacent wireless nodes, are linked together.

In this case, when installing such wireless nodes 601 to 60n in the field to make up a wireless network, the installation is performed by confirming that a wireless link with server node 600 from the proximity of server node 600 can always be established.

For example, wireless node 601 is installed after confirming that a direct wireless link can be established from server node 600; wireless node 602 is installed after confirming that a direct wireless link can be established from server node 600; wireless node 603 is installed after confirming that a direct wireless link can be established from server node 600, and wireless node 604 is installed after confirming that a direct wireless link can be established from server node 600.

Next, wireless node 605 is installed after confirming that a direct wireless link can be established from wireless node 602; wireless node 606 is installed after confirming that a direct wireless link can be established from server node 603, and wireless node 607 is installed after confirming that a direct wireless link can be established from server node 606.

By thus installing wireless nodes 601 to 60n, all wireless nodes 601 to 60n are linked to server node 600 via at least one wireless link path.

For example, wireless node 607 is linked to server node 600 via wireless nodes 606 and 603, and wireless node 605 is linked to server node 600 via wireless node 602.

After all wireless nodes 601 to 60n are installed in this way, adjacent wireless nodes 601 to 60n to which a wireless link from wireless nodes 601 to 60n can be established are investigated one by one in order with respect to each wireless node 601 to 60n from server node 600. Upon detecting an adjacent wireless node 601 to 60n to which wireless link can be established and upon getting information, each wireless node 601 to 60n notifies this information to server node 600 via the path which became known to be wirelessly linked to at least server node 600 when wireless nodes 601 to 60n were installed.

For example, although it is known that wireless node 607 already has a wireless link established with wireless node 606, it may also form a wireless link with wireless nodes 602 and 605. Wireless node 607 notifies this to server node 600 via wireless nodes 603 and 606.

Thus, server node 600 obtains adjacent wireless link information for all wireless nodes 601 to 60n and, when a certain wireless node between two points is specified based on the wireless link information, forms the combination of paths for wirelessly linking the two points.

When one of wireless nodes 601 to 60n (wireless communication unit) communicates with another wireless node 601 to 60n (wireless communication unit) disposed in the wireless network, it becomes possible for server node 600 to notify the combination of paths for wirelessly linking the two points to wireless node 601 to 60n which has made a request.

For example, when wireless node 601 wants to communicate with wireless node 606, wireless node 601 requests the path information of the wireless link with wireless node 606 to server node 600 and receives information on the combination of paths. According to this path information, wireless node 601 forms a wireless link with wireless node 606 via wireless nodes 602 and 603 to perform communication.

At this moment, when the path information received from server node 600 has some deficiency disabling the formation of a wireless link, wireless node 601 may make an inquiry to server node 600 again and receive information on another combination of notified paths to perform communication with wireless node 606.

For example, when a communication failure temporarily occurs between wireless nodes 602 and 603 disabling the formation of the wireless link between them, wireless node 601 can communicate with wireless node 606 via wireless nodes 605 and 607, which are another combination of paths.

In order to achieve this, each wireless node 601 to 60n may retain a plurality of paths for making an inquiry to server node 600.

Further, by proving server node 700 besides server node 600 as the server node for providing information on the combination of paths thereby preparing a plurality of server nodes, it is possible to avoid an event in which path information is not provided to wireless nodes 601 to 60n when server node 600 fails in a wireless network which is provided with only one server node 600, by further providing server node 700 to notify information on the combination of paths to wireless nodes 601 to 60n.

By using such a wireless network, it becomes possible for wireless nodes such as wireless node 601 and wireless node 606, which are at out-of-sight locations, where a high-frequency signal transmitted from one location will not directly reach the other location, to perform communication via adjacent wireless nodes.

Next, an example of information on the combination of paths, which server nodes 600 and 700 provide to each wireless node 601 to 60n, will be shown.

Description will be made on a case in which wireless node 601 so far described forms a wireless link with wireless node 606 to perform communication via wireless nodes 602 and 603.

Figure 7:
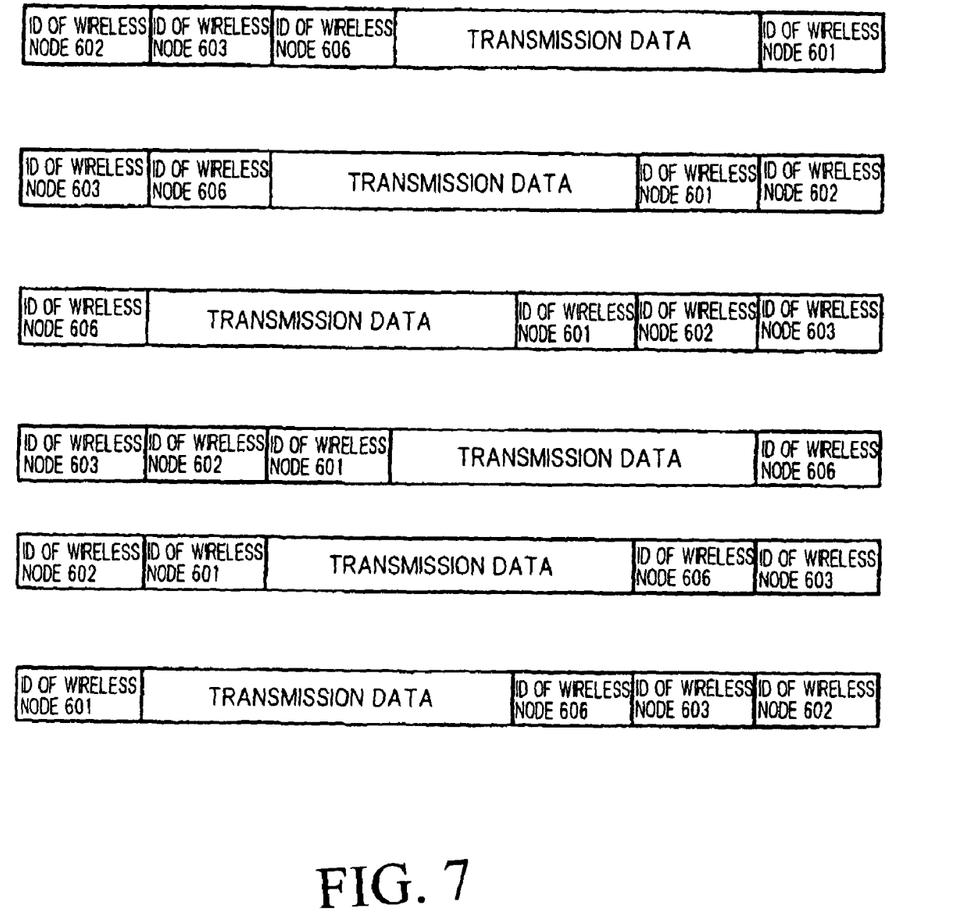
FIG. 7 is a data configuration diagram to show the path information and transmission data of the exemplary embodiment.

First, information on the combination of paths which wireless node 601 has received from server node 600 is as shown in FIG. 7.

It is shown that information on the combination of paths is configured to be data in which IDs that indicate identification codes for respective wireless communication units at wireless nodes 602 and 603, through which a formed wireless link passes, and at wireless node 606 which is the counterpart of communication to node 601, are lined up, and data which provides address information for performing communication via wireless nodes in the order of the IDs shown by information on the combination of paths.

Upon receiving the path information from server node 600, wireless node 601 adds transmission data to be transmitted to wireless node 606 in the rear of the path information, and adds the ID of wireless node 601, which is the source, in the rear of the transmission data, thereafter sending them to wireless node 602.

Having received data transmitted from wireless node 601, wireless node 602 removes the ID indicating the destination of wireless node 602 added in the head of the transmitted data, and moves this ID to the rear of the ID of wireless node 610, thereafter transmitting the data to wireless node 603 which is the next destination.

By doing this, the data transmitted from wireless node 602 shows that it was transmitted from wireless node 601, then transmitted from wireless node 602, that the next wireless node to which a transmission is to be made is wireless node 603, and that the next destination wireless node to be wirelessly linked from wireless node 603 will be wireless node 606.

Similarly, when wireless node 603 receives data transmitted from wireless node 602, the ID of wireless node 603 in the head is moved to the end of the data, and transmission will be made from wireless node 603 to wireless node 606 according to the ID of wireless node 606 which has been newly indicated in the head of the transmission data.

Thus, the data including information on the combination of paths to be transmitted from each wireless node 601 to 60n clearly indicates from which wireless node 601 to 60n this data has been transmitted, and to which wireless node 601 to 60n the data is to be delivered via which order of wireless nodes 601 to 60n, at whichever wireless node 601 to 60n the data is located.

Upon receiving data transmitted from wireless node 603, wireless node 606 decodes the ID of wireless node 606 indicated in the head of the data and, when it is confirmed that the ID is its own ID, that is, its own unit identification code, then decodes the transmission data indicated in the rear of the ID.

When wireless node 606 responds to wireless node 601, transmission to wireless node 603 is performed such that: the IDs of respective wireless nodes in the end of received data are aligned in the order opposite to that of the received data, that is, in the order of wireless nodes 603, 602, and 601 and are placed in the head of the response data as the path information for response; the transmission data to be transmitted to wireless node 601 is added in the rear of the path information; and in the rear of the transmission data, the ID of wireless node 606 which is the source (that is, transmitting wireless node) is added.

Then, through processing similar to those of the procedure so far described, the transmission from wireless node 603 will arrive at wireless node 601 via wireless node 602.

In such a mesh-like configuration, it is even possible to dispose wireless nodes at a small distance, for example, at an interval of 10 meters.

For this reason, the sensitivity decline during reception standby can be sufficiently compensated by a short distance displacement of wireless nodes, and therefore such configuration is suitable for wireless communication units of this type.

Further, because there are a greater number of nodes in a mesh-like network, activation by malfunction may increase in a simple carrier wave detection scheme, and wasted power consumption thereby may shorten the life of wireless nodes. To cope with these, the present invention is configured such that the entire configuration of a wireless communication unit is activated only during the calling to the own unit thereby eliminating the activation of the entire configuration due to malfunction.

Because of this, wasted of power consumption due to malfunction will be eliminated.

As described so far, excellent effects shown below will be obtained according to the present invention.

(1) According to the present invention, since the direct demodulation standby part performs standby reception such that power consumption of the wireless communication unit is minimized and thereafter power can be supplied to the transmitting/receiving part, which is the bulk component of the wireless communication unit, only for a period of time needed for the reception and transmission by the wireless communication unit, it is possible to extend the life of battery which supplies power to the wireless communication unit.

(2) Since reception during reception standby of the present invention utilizes a carrier wave itself, which is included in a received high-frequency signal, as the carrier signal for demodulation, the direct demodulation standby part for performing standby reception does not need a local oscillator made up of a circuit such as VCO/PLL, and therefore power consumption will be effectively reduced.

(3) Because it can be used for a wireless network having a configuration such as a mesh-network, the present invention can be applied to PHS or the like which requires a small amount of transmission power.

(4) According to the present invention, since reception during standby is performed by a direct demodulation standby part which has a simple structure and requires small power consumption, power consumption during standby can be reduced.

(5) According to the present invention, since the transmitting part for transmitting a high-frequency signal has the same structure as a conventional one and does not need a dedicated transmitting part for the transmission during standby, the structure of the wireless communication unit will not become too complicated and therefore this exerts an excellent effect in suppressing power consumption.

The invention claimed is:

1. A wireless communication unit comprising a transmitting-receiving part which transmits and receives a high-frequency signal including an identification code for individually identifying the wireless communication unit, said wireless communication unit comprising:

a direct demodulation standby part for prestoring an own unit identification code which indicates said identification code of its own, and for demodulating said high-frequency signal to compare said identification code included in said high-frequency signal with said own unit identification code;

an intermittent power supply part for intermittently supplying power to said direct demodulation standby part; and a power control part for controlling the power supply to said transmitting/receiving part, wherein said direct demodulation standby part notifies, to said power control part and said intermittent power supply part, whether or not said identification code coincides with said own unit identification code after comparing the both, said power control part supplies power to said transmitting/receiving part upon receiving a notification from said direct demodulation standby part, indicating that said identification code coincides with said own unit identification code, and said intermittent power supply part intermittently supplies power to said direct demodulation standby part upon receiving a notification indicating that said identification code does not coincide with said own unit identification code, from said direct demodulation standby part.

2. The wireless communication unit according to claim 1, wherein said direct demodulation standby part comprises:

a power divider for power dividing said received high-frequency signal, a delay element for delaying said high-frequency signal power divided by said power divider, an analog multiplier for being inputted together with said power divided high-frequency signal and the high-frequency signal delayed by said delay element to multiply them together and for outputting a multiplication signal, and a filter for removing a high-frequency component from said multiplication signal outputted from said analog multiplier to output a direct demodulation signal including said identification code of said wireless communication unit, wherein said direct demodulation signal outputted from said filter is a signal demodulated from a carrier wave included in said high-frequency signal.

3. The wireless communication unit according to claim 1, wherein said intermittent power supply part comprises a timer and, at a time specified by said timer, supplies power to said direct demodulation standby part.

4. The wireless communication unit according to claim 1, wherein said high-frequency signal is a binary amplitude modulated, frequency modulated or phase modulated signal.

5. The wireless communication unit according to claim 1, wherein when a plurality of said identification codes are included in said high-frequency signal and the plurality of said identification codes are listed, transmission/reception is performed by relaying in turn to each of said wireless communication units corresponding to said listed identification codes.

6. A wireless network, wherein the wireless communication unit according to claim 1 is disposed at a location at which communication with at least one adjacent other wireless communication unit is possible such that a plurality of wireless communication units are disposed in a net-like state, a network management server for storing paths which enables communication between the mutually adjacent wireless communication units is provided, and when one of said wireless communication units communicates with another one of said wireless communication units disposed in said wireless network, said network management server notifies the combination of said paths stored in said network management server.

7. A method of controlling power for a wireless communication unit performed in the wireless communication unit, which comprises: a transmitting/receiving part for transmitting/receiving a high-frequency signal including an identification code for individually identifying the wireless communication unit; and a direct demodulation standby part for prestoring an own unit identification code indicating said identification code of its own, and for demodulating said high-frequency signal to compare said identification code included in said high-frequency signal with said own unit identification code, wherein when said direct demodulation standby part detects that said identification code coincides with said own unit identification code, power is supplied to said transmitting/receiving part, and when said direct demodulation standby part detects that said identification code does not coincide with said own unit identification code, power is intermittently supplied to said direct demodulation standby part.

* * * * *